United States Patent
Jain

(10) Patent No.: US 7,933,397 B2
(45) Date of Patent: Apr. 26, 2011

(54) TELEPHONE SYSTEM THAT NOTIFIES CALLER OF CALLED PARTY'S STATE

(75) Inventor: Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1489 days.

(21) Appl. No.: 11/185,188

(22) Filed: Aug. 25, 2005

(65) Prior Publication Data

US 2007/0064906 A1    Mar. 22, 2007

(51) Int. Cl.
*H04M 11/00*    (2006.01)
(52) U.S. Cl. .............. 379/215.01; 379/93.35; 379/93.23
(58) Field of Classification Search .............. 379/93.35, 379/201.01, 93.23, 215.01
See application file for complete search history.

(56) References Cited

U.S. PATENT DOCUMENTS

| | | | | |
|---|---|---|---|---|
| 6,026,156 A * | 2/2000 | Epler et al. | ............... | 379/215.01 |
| 6,219,413 B1 * | 4/2001 | Burg | ............... | 379/215.01 |
| 6,724,872 B1 * | 4/2004 | Moore et al. | ............... | 379/93.35 |
| 7,054,429 B2 * | 5/2006 | Creamer et al. | ......... | 379/215.01 |
| 7,123,707 B1 * | 10/2006 | Hiri et al. | ................. | 379/215.01 |
| 7,616,623 B1 * | 11/2009 | Al Hakim et al. | ............ | 370/352 |
| 2004/0001580 A1 * | 1/2004 | Mason | ...................... | 379/207.04 |
| 2004/0148395 A1 | 7/2004 | Schulzrinne | | |

FOREIGN PATENT DOCUMENTS

EP    0924917 A2    6/1999

OTHER PUBLICATIONS

Barnes, An Extension of the Session Initiation Protocol for Request History Information, Oct. 2003, pp. 1-23.
Schulzrinne, et al,The Reason Header Field for the Session Initiation Protocol (SIP), Dec. 2002, pp. 1-8.

* cited by examiner

*Primary Examiner* — Ahmad F Matar
*Assistant Examiner* — Oleg Asanbayev
(74) *Attorney, Agent, or Firm* — Marger Johnson & McCollom, P.C.

(57) ABSTRACT

A telephone system that has the ability to provide a caller with additional information (beyond a busy signal or a ring tone) concerning the called party when the called party's line is busy: The called party can control the amount and type of additional information provided to the calling party. In one embodiment, when the called party is notified that someone is trying to place a call (by a mechanism such as by conventional caller ID) the called party has the option of providing the calling party with a variety of different information, such as whether or not the called party is on a conference call and the number (and name if available) of the party to whom the called party is speaking.

18 Claims, 3 Drawing Sheets

TELEPHONE SYSTEM THAT NOTIFIES CALLER OF CALLED PARTY'S STATE

FIELD OF THE INVENTION

The present invention relates to telephony and more particularly of features in telephone systems.

BACKGROUND

There are a great many different types of telephone systems in widespread use. For example there are conventional telephone systems, generally referred to as Plain Old Telephone Service (POTS) systems. There are cellular telephone systems that provide connections by various radio frequency protocols. Other modern telephone systems utilize Voice Over Internet Protocol (VOIP) technology. The specific preferred embodiments described herein related to VoIP systems; however, it should be understood that other embodiments are possible using other types of telephone systems;

In general, there are two types of telephone calls. In the first and most common situation, there is a single calling party and a single called party. In the second type of call, generally referred to as a conference call, a number of parties are connected together.

Calls other than conference calls, have a single calling party and a single called party. In the simplest situation, if a call is placed to a telephone that is busy with a first call, the calling party merely receives a busy signal and no indication concerning the first call is given to the calling party. Features such as call waiting and caller ID provide the called party with an indication that someone is trying to reach them. However, the calling party is given no significant information other than a ring tone or a busy signal.

Voices over IP (VOIP) telephones are gaining popularity. There are many different varieties of VOIP telephones commercially available. Many VOIP telephones include a display that includes "soft keys". Soft keys are keys that can be programmed to provide a variety of functions. The embodiments of the invention described below utilize such soft keys. However, it should be understood that the soft keys are merely one mechanism for sending signals from a handset to the device controlling the handset. A wide variety of other such mechanisms are available.

When a call is placed over any type of telephone system, the user who places the call and the users who is called are provided with various information. For example, if the called telephone is busy, a busy signal is generally sent to the party that placed the call. In other systems, when a called telephone is busy, the calling party is connected to a voice mail system. A party who calls a line that is busy, may hear a busy signal, or hear various types of messages, but such a caller is not given information abut the call that is in progress.

SUMMARY

The embodiments described below provide a system that has the ability to provide a caller with additional information (beyond a busy signal, a ring tone or a pre-configured voice message) concerning the called party. The called party can control the amount and type of additional information provided to the calling party.

In one embodiment, when the called party is notified that someone is trying to place a call (by a mechanism such as by conventional caller ID) the called party has the option of providing the calling party with a variety of different information, such as whether or not the called party is on a conference call and the number (and name if available) of the party to whom the called party is speaking. The amount and type of information provided to a calling party can be pre-established in a profile.

DETAILED DESCRIPTION

Figure 1:
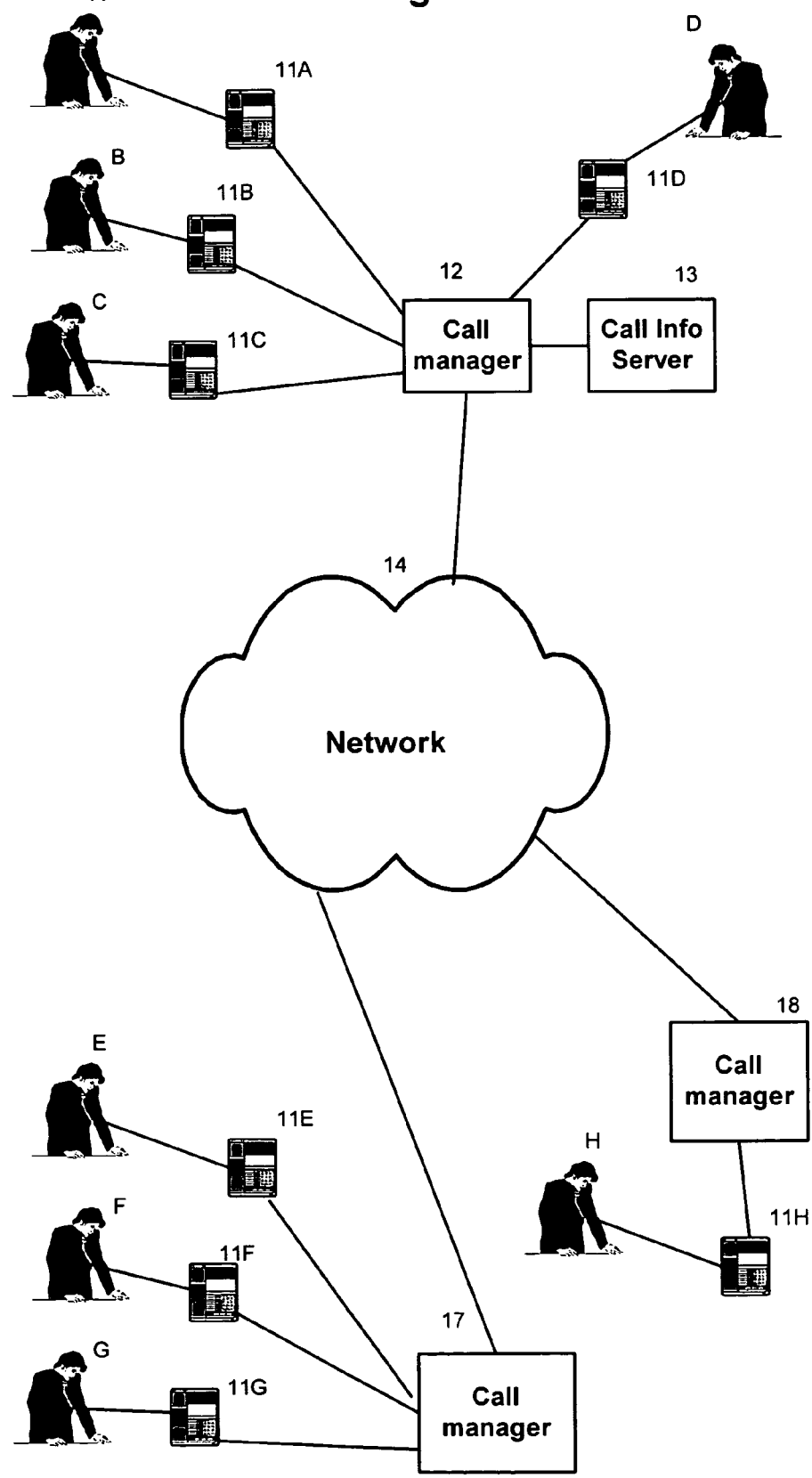
FIG. 1 is an overall diagram of a first embodiment.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. In situations where an element appears in multiple figures, the same reference numeral is used to denote the same element in each of the multiple figures.

Only those parts of the various units are shown and described which are necessary to convey an understanding of the embodiment to those skilled in the art. Those parts and elements not shown are conventional and known in the art.

It is noted that telephone calls are placed to particular telephone numbers (that is to particular telephones) and not to specific individuals. However, to facilitate the explanation of the applicant's invention, herein, the term called party will be used to mean a particular telephone with a particular telephone number. That is, as used herein, the term, called party does not refer to an individual; instead it refers to a particular telephone and the user of that particular telephone An overall diagram of a first embodiment of the invention is shown in FIG. 1. This first embodiment consists of a VoIP system with several users A, B, C, D, etc. Each of the users A, B C, D, etc. has a handset, namely handsets 11A, 11B, 11C, 11D, etc. The four handsets 11A, 11B, 11C and 11D are connected to a single "Internet Protocol Private Branch Exchange" (IP-PBX) system 12.

The IP-PBX system 12 is connected to a call response server 13 by means of an API. It should be understood that most practical IP-PBX systems have many more than four users; however, only four representative users are shown in FIG. 1 for convenience and simplicity of illustration and explanation.

The IP-PBX shown in FIG. 1 is connected to a wide area network (WAN) 14 that could, for example, be the Internet. Alternatively network 14 could. be a local area network (LAN). In a typical situation, many other users (only a few of which are shown) are also connected to the Internet by other IP-PBXs. The first embodiment will focus on the users A, B C and D that are connected to the same IP-PBX 12. Other embodiments will focus on users that are connected to different IP-PBX systems.

Consider as a first example, a situation where users A, B and C are involved in a conference call and while the conference call is in progress, user D tries to place a call to user A. In a conventional system, user D would receive a busy signal and possibly be re-directed to a voice mail system. In some conventional systems. that have a user ID feature, user A would be notified that D is trying to place a call and user A would have the option to put the conference call on hold and pick up the call from user D. However, even in such a system if user A does not choose to pick up the call, user D would either receive a busy signal or be directed to a voice mail system.

In contrast to the above-described conventional response, with the first embodiment shown here, when user A receives an indication (via called ID) that user D is trying to place a call to user A, user A would have available several options described below. It should be noted that the options listed below are for a first relatively simplified embodiment. Other embodiments described later have other options available. In this simplified embodiment, the options available to a called party A, when party A is involved in a conference call and party A receives a call from party D and are:

1) User A could place the conference call on hold and user A could pick up the call from D as in a conventional system.
2) User A could press a particular key on his handset and user D would receive a message that user A is involved in a conference call and that he can not pick up the call.
3) User A could press a different particular key on his handset and user D would be informed of the name of the people on the conference call. In a business environment, this would inform user A that these other people are also busy and that it would serve no purpose to try to reach them at this time.
4) User A could press a different particular key and then enter a number via the key pad and user D would be informed that user A will be busy for the number of minutes that user A entered on the keypad.

The above is just one simplified example. Various other alternatives are described below.

Figure 2:
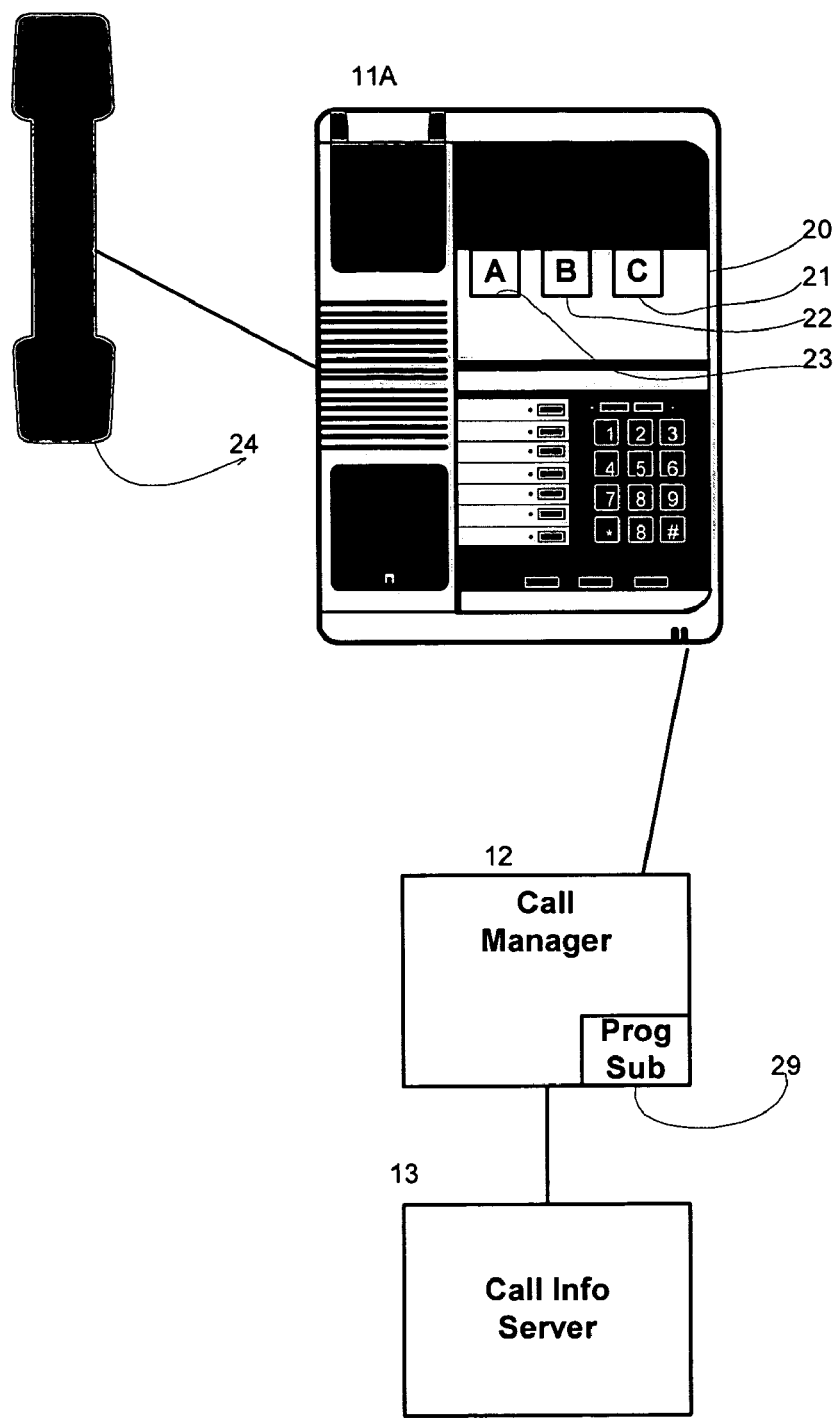
FIG. 2 is a more detailed diagram of some parts of the first embodiment.

FIG. 2 shows in more detail one of the handsets 11A, the IP-PBX 12, and the call response server 13. Handset 11A includes a display panel 20 and a hand piece 24. Soft keys, such as those designed 21, 22, and 23 can be displayed on display panel 20. Soft keys are keys that are displayed on the display screen 20 by the IP-PBX 12. The screen 20 is a touch screen and a program in IP-PBX detects a signal when a user touches one of the soft keys. Softkeys are a conventional part of commercially available VoP handsets. For example such keys are available on the VoIP handset marketed by Cisco Systems Inc. as the model 7690 IP phone.

As is conventional, the IP-PBX 12 consists of a combination of call processing software and a server platform on which the software operates. For convenience of reference, herein, the combination of call processing software and the server on which such software is operating will be referred to as a IP-PBX.

As a specific example, the call processing software in the IP-PBX 12 can include a program, referred to in technical literature, as the Cisco CallManager. The Cisco CallManager is a software call processing system that runs on various server platforms such as those listed below. There is a publicly available book: Entitled, "Cisco CallManager Fundamentals: A Cisco AVVID Solution": by John Alexander, Chris Pearce, Anne Smith, and Delon Whetten, published by Cisco Press, ISBN: 1587050080, July 2001. The above referenced book describes the Cisco CallManager program.

The server on which the call processing software operates can, for example, be server platforms such as the Media Convergence Servers (MCS) models 7815-1000, 7825-1133 or 7835-1266 commercially marketed by Cisco Systems.

The IP-PBX 12 includes a conventional call agent that sets up calls between various parties and a program that can display and receive signals from "soft keys" on the display 20. The call setup program and the soft key management program are indicated in FIG. 2 by the box 29. The call setup program sets up calls in a conventional manner. Likewise the soft key management program manages the setup and sensing of the soft keys in a conventional manner. The signals from the soft keys are sent to the call response server 13 that provides responses (or which pushes information) to the calling party.

IP-PBX 12 has an application programming interface (an API) that provides detailed information on every call that is being handled by the IP-PBX 12. Conventional commercially available call management programs that have such an interface available. Two such interfaces that are in use are the JAVA Telephone API (JTAPI) and the Computer Telephony Integration (CTI) interface.

The soft key management software in the IP-PBX 12 can also accept and transfer to call response server via the API numbers that a user punches into the keypad on the handset which indicate the length of time the user expects a call to last.

The API in the IP-PBX provides the following information to the call response server for each call being handled:
1) The party being called.
2) The calling party information
2) The status of the called parties line including the telephone number of the other parties if the line is busy.
3) Information concerning any of the soft keys that have been pressed.
4) A number entered into the keypad on the handset (indicating the expected length of a call) after the user presses a particular soft key.

The API on the IP-PBX can accept an audio message from the call response server 13 and transfer such messages to a calling telephone. The API on the IP-PBX API can also accept text messages from the call response server 13 and transfer such messages to the display of a calling party's handset. T is noted that the text messages are provided to the IP-PBX on an XML interface. Interfaces such as JTAPI, TAPI and CTI are generally used for control information.

The call response server 13 includes a conventional CPU and memory. A program in the call response server 13 performs the functions described below. The call response server 13 includes a profile memory 13A. At setup time, a profile is established for each telephone line (for each handset if each handset only has one line). The profile indicates how the calls to the particular line are to be handled. That is, what options the user has available and what information should be provided to the caller for each option. The details of the actual programming that performs each of the described steps is conventional.

Figure 3:
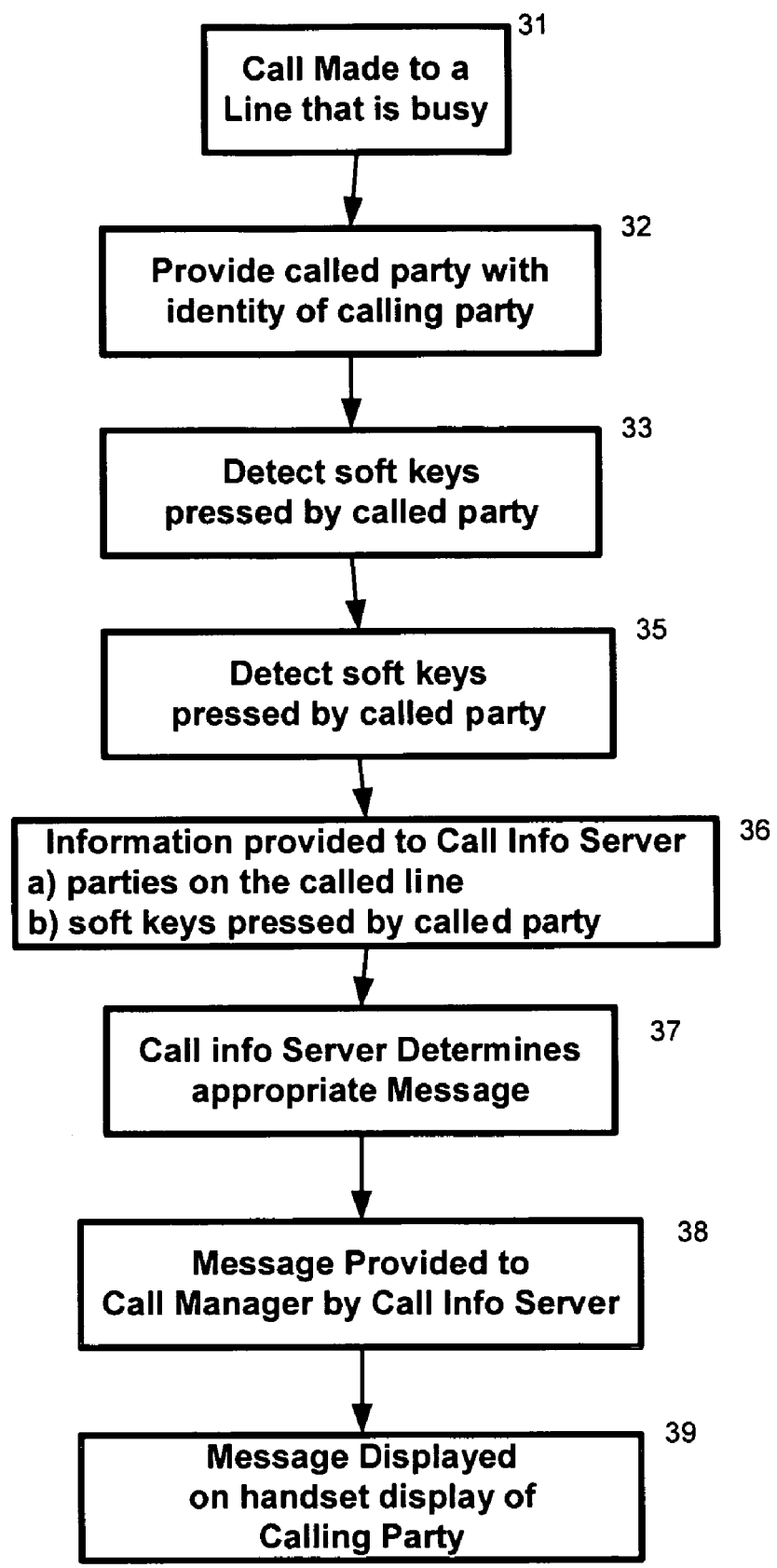
FIG. 3 is a block flow diagram showing the operation of the system

FIG. 3 is a block flow diagram showing an example of how the system operates. As described below, many other scenarios and options are also possible.

Most of the steps and functions shown in FIG. 3 are performed by caller response server 13 under control of a program located in caller response server 13. The operation begins when the information provided by IP-PBX 12 indicates that the line of a called party is busy as indicated by block 31.

The IP-PBX provides the called party with an indication of the identity of the calling party as indicated by block 32. This is done by a conventional caller ID function.

As indicated by block 33, the IP-PBX detects whether or not the called party has pressed any soft keys. Note that the system can be programmed to give the called party several options. That is, various soft keys can be available to the called party. The program for displaying soft keys is conventional. In the specific example shown in FIG. 3, the user is provided with four soft keys that have the following functions.

Key one: this key indicates that the called party wants the calling party to be informed that the called party is on a conference call. No information is give about the identity of the parties on the conference call.

Key two: this key will indicate that the called party would like to inform the calling party as to with whom the called party is speaking. If the called party is on a conference call the name of the first four people on the conference call will be given to the calling party. Note, other embodiments provide various other information.

Key three: this key will indicate that the called party would like to inform the calling party as to the expected length of time the called party will be busy. After pressing this key, the called party will enter a number in the handset using the regular key pad. The calling party will be informed that the called party expects to be busy for the number of minutes that the called party entered in the key pad.

Key four: this key will indicate that the called party merely wants the calling party to be given a busy signal.

It should be understood that the above four options are merely representative of the information that can be provided to the calling party at the request of the called party. These are the options specified in the profile in memory 13A of the particular called party line.

If the called party does not press any of the soft keys, there is a default operation (that is pre-set) that takes place as indicated by block 34. This can be established at system set up time.

As indicated by block 35, the information about the call is provided to the call response server 13. The call response server interrogates the called parties profile in memory 13A to determine the particular options selected by the particular called party. From the information received and from the options that have been established when the system was set up, the call information server determines the appropriate message for the calling party as indicated by block 37. As indicated by block 38, the message is provided to the IP-PBX. Finally as indicated by block 39, the appropriate information is displayed on the display of the appropriate handset of the calling party or alternatively a machine generated voice message is provided to the calling party.

In alternate embodiments, the system could be setup to have an option whereby a caller who is connected to the same IP-PBX would always receive the name of the person to whom a called party is talking. Alternatively the same could be programmed so that selected callers would always receive the name of the person to whom the called party is speaking.

The profile for each user can be established in a number of ways. In the simplest embodiment, all users have a single profile. That is calls to all users are handled in the same manner. In another embodiment each user is free to set up and change a profile from a web like interface to the call response server. In still another embodiment, a system administrator is responsible for setting up a profile for each user and only the system administrator can change profiles. The profile can specify options such as, which calling parties or classes of calling parties should be given the name of the person to whom a called party is speaking, which calling parties or class of calling parties should be given merely a busy tone, which names should never be given to the calling parties.

In one option, the called party can use the keypad to enter a number to inform the calling party how long the called party expects to be busy. In another option if the called party is on a conference call, other sources such as meeting schedules are searched to automatically determine the expected length of the call.

The process of notifying a called party is relatively simple if the called party and the calling party's handsets are connected to the same IP-PBX. In such a situation, messages to the calling party generated by the response server 13, merely pass through the IP-PBX to the calling party.

In a situation were the calling party is connected to a different IP-PBX than is the called party, or in a situation where the called party is connects to a IP-PBX and the calling party is connected to a POTS type PBX, the call setup program in the IP-PBX must be modified to the extent that it can transfer voice messages back to the called party. In one embodiment such communication is accomplished as follows: When a call arrives at the called party's IP-PBX, a separate channel is established between the called and the calling call agents. This channel is used to send verbal or control messages to the calling party.

When a call is set up using one of the conventional protocols such as SIP, a channel is established between the calling PBX and the called PBX. This channel can be used to send messages back to the calling party.

It is noted that the term called party line, is used herein to mean an individual telephone line to a particular user such as the line user A in FIG. 1. A called party line is a telephone line with a particular telephone number.

A wide variety of alternative embodiments are possible. For example, in one embodiment, when a called party is engaged in a conference call, the server that is handling the conference call is interrogated to determine information such as the other parties on the call and the expected time duration of the conference call. The appropriate parts of this information are then transmitted to a calling party as specified by the called parties profile.

In still another embodiment, a server that stores the called party's schedule is interrogated to obtain information. Selected information about the called party's schedule is provided to the calling party in accordance with a profile previously established by the called party.

In another embodiment, when a called party is in a do-not-disturb mode, the system can interrogate the called party's IP-PBX to determine how long the party has been in this mode and this information can be provided to the calling party.

Certain embodiments of the disclosed technology may include a non-transitory, tangible computer readable storage medium storing instructions that, when executed by a processor, may direct the processor or other components of a computer system to perform any of the methods described herein. A non-transitory, tangible computer readable storage medium as used herein may include, for example, volatile and/or non-volatile memory, e.g., random-access memory (RAM) and read-only memory (ROM), or other storage devices or media such as hard disk drives, flash memory, memory sticks or thumb drives, compact discs (CDs), digital video discs (DVDs), floppy disks, tapes, and optical storage devices.

While the invention has been shown and described with respect to preferred embodiments, thereof, it should be understood that various changes in form and detail can be made without departing from the spirit and scope of the invention. The scope of the invention is limited only by the appended claims.

I claim:

1. In a telephone system that can set up a call placed by a calling user from a calling user line to a called user at a called user line, a method comprising:
   determining if said called user line is busy;
   if said called user line is busy, automatically determining to what parties the called user line is connected, comprising identifying names of the parties to whom the called user line is connected; and
   responsive to the called user pressing one of a plurality of soft keys and based at least in part on a user profile corresponding to said called user line, informing the calling user of information related to the parties to whom the called user line is connected, wherein the plurality of soft keys comprises:
      a first key that, when selected by the called user, informs the calling user that the called user is on a conference call; and
      a second key that, when selected by the called user, informs the calling user of the names of the parties to whom the called user line is connected.

2. The method recited in claim 1 wherein the calling user line and the called user line are connected to the same IP-PBX.

3. In a telephone system that handles calls from a calling user at a calling user line to a called user at a called user line, a response system comprising:
   means to determine if said called party line is busy;
   means to automatically determine to what parties the called user line is connected if the called user line is busy, comprising means to identify names of the parties to whom the called user line is connected; and
   means to inform the calling user line of information related to the parties to whom the called party line is connected based at least in part on a user profile corresponding to said called user line and if the called user presses one of a plurality of soft keys comprising:
      a first key that, when selected by the called user, informs the calling user that the called user is on a conference call; and
      a second key that, when selected by the called user, informs the calling user of the names of the parties to whom the called user line is connected.

4. The response system recited in claim 3 wherein the calling user line is provided with only a busy signal if the called user presses a third one of the plurality of soft keys.

5. The response system recited in claim 3 wherein said telephone system is a voice over Internet Protocol (VoIP) system.

6. The response system recited in claim 3 wherein said information comprises an expected length of time until the called party line will not be busy.

7. A telephone system for connecting calls placed by a calling user at a calling user line to a called user at a called user line, said telephone system comprising:
   a Private Branch Exchange (PBX) comprising a call setup mechanism for setting up calls to said called user line, said PBX having an application programming interface (API) configured to provide information concerning said calls to said called user line; and
   a response server connected to said API, said response server generating messages to said calling user line that provide information concerning parties to whom said called user line is connected when said called user line is busy based on the called user selecting one of a plurality of soft keys at said called user line, said plurality comprising:
      a first key that, when selected by the called user, informs the calling user that the called user is on a conference call;
      a second key that, when selected by the called user, informs the calling user of the names of the parties to whom the called user line is connected;
      a third key that, when selected by the called user, informs the calling user of an expected length of time that the called user expects to be busy; and
      a fourth key that, when selected by the called user, provides the calling user with a busy signal.

8. The system recited in claim 7 wherein the calling user line and the called user line are connected to the same IP-PBX.

9. The system recited in claim 7, further comprising a telephone handset connected to said called user line, said telephone handset having a screen configured to indicate an identification of said calling user line.

10. The system recited in claim 7 wherein said response server comprises a user profile indicating what information should be provided to the calling user line concerning the parties to whom said called user line is connected when said called user line is busy.

11. A non-transitory, tangible computer readable storage medium storing instructions that, when executed, cause a system to perform the method recited in claim 1.

12. The response system recited in claim 3 further comprising means for performing a default operation if the user of the called user does not press any of the soft keys.

13. The method recited in claim 1 wherein the plurality of soft keys further comprises a third key that, when selected by the called user, informs the calling user of an expected length of time that the called user expects to be busy.

14. The method recited in claim 13 wherein the plurality of soft keys further comprises a fourth key that, when selected by the called user, provides the calling user with a busy signal.

15. The method recited in claim 1 wherein each of the plurality of soft keys are displayed on a display screen.

16. The method recited in claim 15 wherein the display screen comprises a touch screen.

17. The system recited in claim 9 wherein the screen is further configured to provide the plurality of soft keys.

18. The system recited in claim 17 wherein the screen comprises a touch screen.

* * * * *